United States Patent [19]
Liddell

[11] 3,883,736

[45] May 13, 1975

[54] REMOTE CONTROL UNIT

[76] Inventor: William S. Liddell, 612 W. Las Palmas Dr., Fullerton, Calif. 92635

[22] Filed: Jan. 14, 1974

[21] Appl. No.: 433,231

[52] U.S. Cl. .................... 250/221; 250/338; 334/8; 334/10

[51] Int. Cl. .................... G06m 7/00

[58] Field of Search .................... 250/221, 372, 338; 334/8–10

[56] References Cited

UNITED STATES PATENTS

| | | | |
|---|---|---|---|
| 1,866,581 | 6/1932 | Simjian | 250/221 |
| 2,228,780 | 1/1941 | Roberts | 250/221 |
| 3,325,593 | 6/1967 | Platt et al. | 334/8 |
| 3,498,047 | 3/1970 | McLeod et al. | 250/221 |
| 3,519,833 | 7/1970 | Arch et al. | 250/566 |
| 3,629,594 | 12/1971 | Sandberg | 250/221 |
| 3,792,260 | 2/1974 | Stewart et al. | 250/221 |

*Primary Examiner*—Harold A. Dixon
*Attorney, Agent, or Firm*—Fulwider, Patton, Rieber, Lee & Utecht

[57] ABSTRACT

A remote control system adapted to selectively advance one or more selector switches including a source of optical signal disposed in proximity with a first photo cell, a portable return reflector or retroreflector and means for selectively masking the reflector. The signal developed across the first photo cell is referenced against a second photo cell, such second photo cell being located away from the associated source such that only background signals impinge thereon. In a further embodiment, a plurality of first photo cells are combined with the second photo cell, each such first photo cell being selectively filtered to sense discrete signal frequencies or polarities and a plurality of return reflectors or retroreflectors, selectively filtered in correspondence to the photo cell filters, are disposed for selective exposure by associated masking means.

7 Claims, 8 Drawing Figures

REMOTE CONTROL UNIT

BACKGROUND OF THE INVENTION

1. Field of the invention

The present invention relates to remote control systems and more particularly to a passive signaling system for remote switching which utilizes reflected electromagnetic signals within or substantially around the light spectrum frequency.

2. Description of the Prior Art

Remote control over switching has had many applications in the past and many devices adapted for such use have been developed. Of such prior art devices, the devices of the wireless type, i.e. devices which propagate a signal either in the acoustic, radio frequency or light frequency range have been known in the past. Such acoustic, radio or optical frequency devices have been hampered quite often by the generally present background noise which exists in practically all real transmission mediums. In order to improve the reliability of signal identification in the presence of such background noise, there have been many different schemes proposed in the past which in one way or another isolate the control signal from the background noise. Most such prior art isolation techniques are based on satistical models of the background medium, such as models of what is referred to as mean time between exceedance of a background signal of a particular frequency above a particular amplitude. Other systems, in addition to the mean time between exceedance consideration, add the requirement of duration, such as pulse width modulated systems where the background noise not only has to be above a certain amplitude and within a certain frequency but also according to a certain duration sequence. For commercial applications, such as general home use, such prior art systems are usually quite sophisticated and require extensive sampling and study of the background noise model in order to assure reliable performance. On the other hand, typical home use environments possess few highly directional sources and are therefore substantially isotropic. While such background models are isotropic, they typically include a very wide range of frequencies as well as varying and increasing energy levels such that the incidence between exceedance of a selected frequency may necessarily require hazardous signal levels to avoid confusion with the background. Typically, as the level of the signal source increases, the general applicability thereof decreases. General utility devices, such as remote control of television channel selection, do not justify such sophistication, complexity or high signal levels and narrow frequency bands. Furthermore, signaling units associated with such prior art systems are generally overly fragile and therefore sensitive to mishandling.

SUMMARY OF THE INVENTION

Accordingly, it is the general purpose and object of the present invention to provide a remote control system which is normalized with respect to the background spectrum and which is sensitive only to local deviation therefrom. Other objects of the invention are to provide a remote control system which utilizes conveniently available signal frequencies. Yet another object of the present invention is to provide a signaling unit associated with such remote control system which is conveniently portable and which is passive, requiring few parts.

These and other objects are accomplished within the present invention by providing a signaling system which operates on signals in the optical frequency range, such signals being directed along a relatively narrow beam to a photo cell receiver which is concurrently referenced to the omnidirectional or the background signal levels. To reduce complexity of any hand-held signaling unit, the signal source and the receiver are combined in a single assembly and the signaling unit is conformed in the manner of a reflector, i.e. a directional reflector, which can be selectively exposed to reflect the omnidirectional optical signal back to the receiver. More specifically, in one embodiment the receiver includes two photo cells connected in a bridge circuit, a first photo cell being aligned for exposure to the section of spherical arc within which the normal reflecting position of the hand-held signaling unit will normally occur, i.e. positioned within the circular region radiated by reflected signal beams to be further excited by such reflected beams. The second photo cell is disposed off to the side in order to sense the background level only. This particular arrangement produces a bridge unbalance signal only if the first photo cell is excited by the reflected signal above the concurrent level of ambient or background signals. The bridge unbalance signal is then utilized to produce switching signals to a stepping relay or a selector switch, such switch being adapted to drive, in one example, the channel selector of a television set.

In a further embodiment, the second reference photo cell is combined with two first photo cells, each selectively covered by polarized filters, one polarized filter being substantially orthogonal to the second. For this application, which permits two remote control functions, the signaling unit is conformed to include more than one reflector to be selectively uncovered and each one of the reflectors is again selectively filtered in the similar manner by polarizing filters.

DESCRIPTION OF THE SPECIFIC EMBODIMENTS

Figure 1:
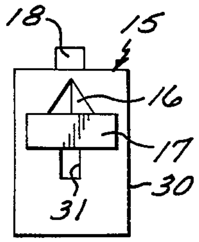
FIG. 1 is a front view schematic of a hand-held signaling device adapted for use with the present invention.

The signaling system is described herein in combination with a television channel selector by way of example only. While such use is particularly suitable for the inventive embodiments disclosed below, other uses of the invention are possible and no intent to limit the scope of use of this invention is expressed thereby.

Generally, the signaling system constructed according to this invention comprises an active unit designated by the numeral 10 comprising a receiver assembly 11 and a signal source assembly 12, the source assembly 12 including a light source 13 which continually radiates a light signal L within a spherical art to be intercepted by a hand-held signaling unit 15. In order to avoid distracting glare from light source 13 encountered by viewers of the controlled television set, it is contemplated that the frequency spectrum of signal L be in the invisible range, i.e. either in the ultraviolet or the infrared range. For other applications, however, signal L may be in the visible spectrum even with the system operating in daylight.

Hand-held signaling unit 15 includes a corner mirror 16 and a pivotally mounted mask or cover 17 which can be selectively articulated to uncover the corner mirror 16 upon depression of a manual button 18.

As will be described in further detail below, corner mirror 16 is constructed to directly return or reflect the omnidirectional signal L towards the location of the light source 13. Thus, when the corner mirror 16 is uncovered by the depression of the button 18 a return signal R, which is a return reflection of signal L, is reflected back to the receiver assembly 11 to be intercepted by a photo cell 20 mounted on the face thereof, in proximity with the light source 13. The receiver assembly 11 is in turn tied by a signal conduit S to a selector switch assembly 25, switch assembly 25 being adapted to be conveniently attached to any device, such as the aforementioned television set (not shown), engaging the shaft of the channel selector switch (not shown) of the television by a shaft adaptor 26 formed on the end of a selector switch shaft 27. In this manner the light signal L, continuously generated by source 13, can be selectively reflected to the photo cell 20 by manipulation of the cover assembly 17. Upon reflecting of the signal L back to the photo cell 20 the photo cell, by means further described below, generates a signal along the signal conduit S to advance, again by means further described below, the selector switch shaft 27 by one selection increment corresponding to one channel increment of the television selector switch.

Figure 2:
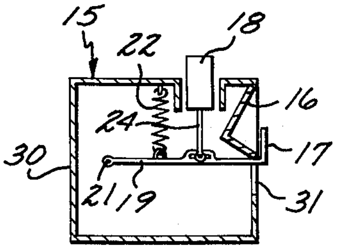
FIG. 2 is a side view, in cross section, of the hand-held unit shown in FIG. 1.
Figure 3:
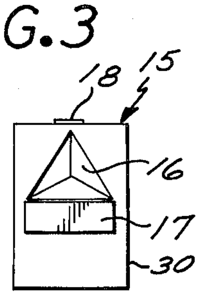
FIG. 3 is a front view of the signaling unit shown in FIG. 1 activated to a signaling position.

As shown in more detail in FIGS. 1, 2 and 3, the hand-held signaling unit 15 comprises an outer casing 30 generally formed in a rectangular box configuration having the corner mirror 16 mounted in one longitudinal side thereof. The cover 17 is shown extending substantially across the corner mirror opening, being mounted on the free end of a pivotal arm 19 which extends to the interior of casing 30 through a slot 31 formed below the corner mirror opening. Arm 19, on the other end, is pivoted from a pivot 21 extending tranversely across the interior of casing 30 and a bias spring 22 is connected between the upper edge of arm 19 and the opposed upper interior surface of casing 30 to urge cover 17 into masking alignment across the opening of corner mirror 16. The articulation of arm 19, and consequently the uncovering of corner mirror 16, is accomplished by the depression of manual button 18 which connects also with the upper edge of arm 19 across a push rod 24.

Figure 4:
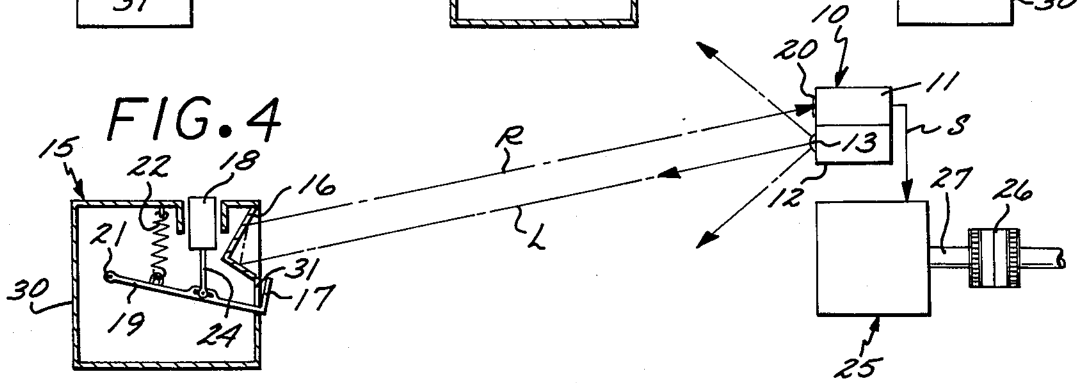
FIG. 4 is a diagrammatic view of the signaling system constructed according to the present invention.

In FIGS. 3 and 4, the cover 17 has been displaced by depressing the manual button 18 to expose the aperture of the corner mirror 16. It is to be noted that the corner mirror 16 typically comprises three triangular sections joined along orthogonal planes to form a tetrahedron apex open at one side where the orthogonal relationship of the triangular sections assures that the light beam L is reflected directly back as the reflected signal R for most alignments of the signaling unit 15.

Figure 5:
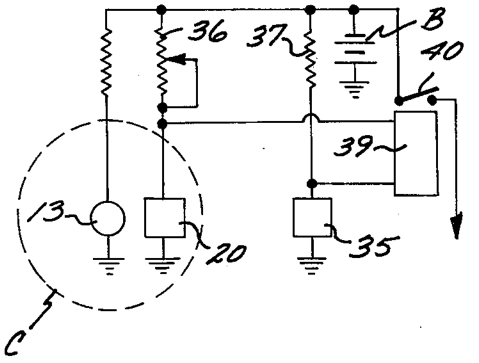
FIG. 5 is a circuit schematic of a photo cell circuit constructed according to the present invention.

As shown in FIG. 5, the reflected beam R is therefore reflected directly back towards the light source 13 and is shown to impinge on the photo cell 20, which is disposed in proximity therewith, by a beam of a cross section C, such beam cross section C being centered substantially at the center of the light source 13. A ballast or reference photo cell 35 is shown also in FIG. 5 outside of the reflected beam pattern or section C, photo cells 20 and 35 being both connected to ground at one terminal thereof while connecting at the respective other terminals thereof to corresponding one ends of resistors 36 and 37. The other ends of resistors 36 and 37 are also joined in common to be excited by the positive side of a battery B. In this manner, a bridge circuit is formed comprising resistors 36 and 37 in the upper legs thereof and photo cells 20 and 35 in the lower legs thereof.

The bridge balance signal is picked off between the common junctures of resistor 36 with photo cell 20 and resistor 37 with photo cell 35. This bridge balance signal is then fed to excite a relay coil 39 connected thereacross which, when excited by a bridge unbalance of a polarity corresponding to the decreased resistance of photo cell 20 when exposed to the reflected beam, closes a switch 40 to energize a relay. Such relay switching signal is carried on the signal conduit S to the selector switch assembly 25.

In order to accommodate various ambient levels or various background levels the resistor 36 is a variable resistor which can be conveniently adjusted such that light excitation of photo cell 20 above a certain level or a preselected level will be required in order to unbalance the bridge in the proper direction to close switch 40.

Figure 6:
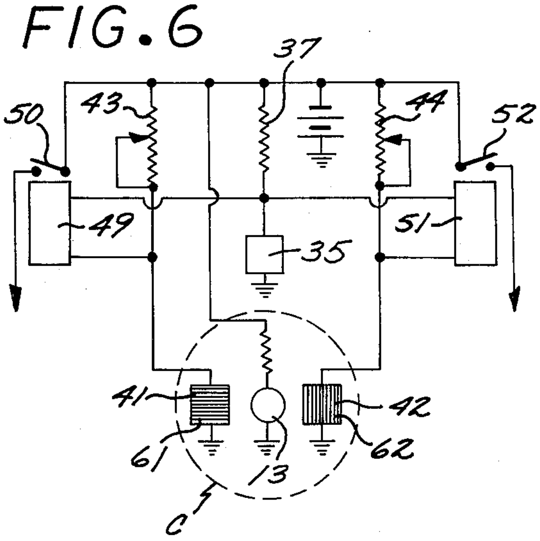
FIG. 6 is yet another embodiment of the circuit schematic shown in FIG. 5.

As shown in FIG. 6, a further modification or variation of the embodiment shown in FIGS. 1-5 can be made by including in the receiver assembly 11 a plurality of receiving photo cells each similarly excited in series with an adjustable resistor, such photo cells being shown as two photo cells 41 and 42 in series with corresponding variable resistors 43 and 44. Also shown in the same circuit is the ballast or reference photo cell 35, photo cells 41 and 35 and 42 and 35 forming respective bridge circuits having one common leg, where the individual bridge unbalance act to excite corresponding coils 49 and 51 in order to close corresponding signals switches 50 and 52. Signal switches 50 and 52 are again brought out along signal conduit S down to the switch selector assembly 25 to effect separate functions. It is to be noted that in this instance the photo cells 41 and 42 are again disposed within the reflected beam cross section C about the signal source 13.

Figure 7:
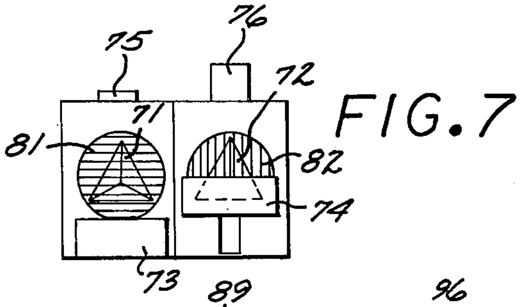
FIG. 7 is a front view of yet another embodiment of the signaling unit shown in FIG. 1 adapted to provide a plurality of signals.
Figure 8:
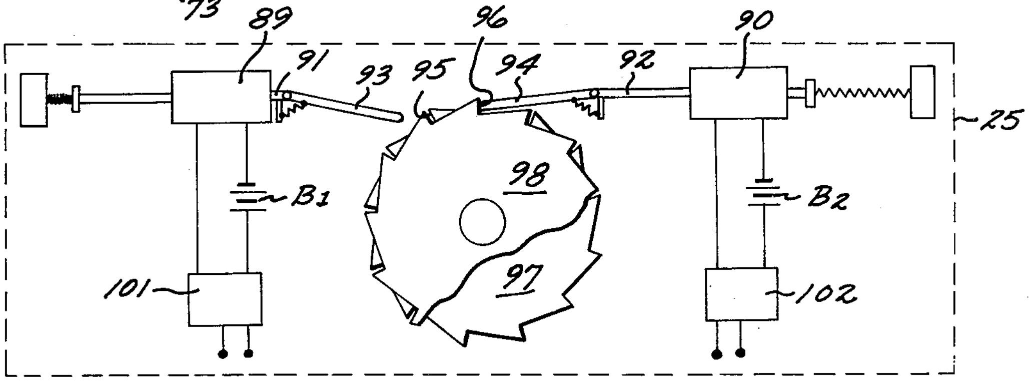
FIG. 8 is a front sectional view of an actuating mechanism adapted for use with the signaling system shown in FIGS. 1–7.

In order to discriminate the particular switching signal desired, photo cells 41 and 42 are respectively covered by corresponding polarized filters 61 and 62 where filter 61 is shown polarized in a horizontal pattern while filter 62 is shown polarized in a vertical pattern. A corresponding signaling unit is shown in FIG. 7 similarly constructed with two corner mirrors 71 and 72 and including corresponding masking assemblies 73 and 74 selectively articulated by associated manual actuation buttons 75 and 76. Corner mirror 71 is also filtered by a horizontally polarized filter 81 while corner mirror 72 is filtered by a vertically polarized filter 82. In this manner, selective switching of switches 50 and 52 can be made to the selector switch assembly which in this embodiment is shown, according to FIG. 8, to include two opposed relay coils 89 and 90, each including an associated armature 91 and 92, respectively, such armatures terminating in corresponding projecting levers 93 and 94, which are selectively articulated to engage teeth 95 and 96 formed on corresponding selector ratchets 97 and 98. In the embodiment shown in FIG. 8, the selector ratchets are shown mounted on a common shaft, i.e. shaft 27, and the selective switching of switches 50 and 52 provides for a reverse and forward rotation of shaft 27, thus facilitating a reverse or forward selection of channels in a conventional television set. It is to be noted that relay coils 89 and 90 are large power solenoids and are therefore provided with individual power sources B1 and B2, power sources B1 and B2 being selectively connected to energize the corresponding solenoids according to the state of associated control relays 101 and 102 which in turn are slaved to the switches 50 and 52.

It is further contemplated within the scope of this invention to provide more than one corner mirror as the reflecting surface, with such corner mirrors being relatively small and arranged in any convenient array, in order to provide a flatter reflecting surface or more convenient shape and to simplify the masking structure and the structural requirements of the outer casing 30.

Furthermore, it is contemplated within this invention to include other filtering schemes such as the red, green and blue filtering of visible light in order to provide a similar function as that provided by the polarized filters. Combining color filters with polarized filters, the system's channel capacity can be further extended.

Some of the many advantages of the present invention should now be readily apparent. The invention provides means by which remote switching can be effected, such means including passive signaling devices, while utilizing readily available signal frequencies.

Obviously, many modifications and variations of the present invention may be made with regard to the foregoing detailed description without departing from the spirit of the invention.

I claim:

1. A remote control unit for rotating a controlled device of the type including a rotary selector and shaft comprising:

an activator on said device including a source of radiated signal to direct a radiated signal along a selected path and first sensing means for sensing signals reflected back from said path;

a signal unit remote from said device and including directional reflecting means for positioning in said path to intercept said radiated signal and reflecting it back to said first sensing means;

mask means on said signal unit for normally blocking said selected path to said reflecting means;

mounting means mounting said mask means from said signal unit for shifting thereof from its closed position confronting said reflecting means to an open position opening said path to said reflecting means;

actuating means on said signal unit and coupled with said mask to normally maintain said mask in its closed position and operable upon actuation thereof to shift said mask to its open position; and control means connected to said sensing means for rotating said selector shaft and operative in response to registration on said sensing means of said reflected signal to rotate said rotary selector shaft.

2. Apparatus according to claim 1 wherein:

said reflecting means includes a corner reflector.

3. Apparatus according to claim 1 wherein: said radiated signal is an electromagnetic signal in the ultraviolet spectrum.

4. Apparatus according to claim 1 wherein:

said sensing means includes a first photo cell connected to ground at one terminal thereof, a second photo cell connected to ground at one terminal thereof in parallel with said first photo cell, resistive means connecting the other ends of said first and second photo cell, said first photo cell being disposed in receiving proximity of the reflection of said radiated signal adjacent said source and said second photo cell being displaced outside the receiving proximity of the reflection of said radiated signal, whereby the sensed differential between said first and second photo cell is indicative of the presence of said reflected signal.

5. Apparatus according to claim 1 wherein:

said reflecting means includes a plurality of corner reflectors, a corresponding plurality of first associated filters, each first filter being respectively disposed over associated ones of said corner reflectors, and a corresponding plurality of manually articulated cover means disposed over said corner reflectors for selective exposure thereof; and said first sensing means includes a corresponding plurality of first photo cells each respectively covered by correspondingly associated second filters, said first and second filters selectively passing in complement selected components of said radiated signal, said first photo cells being disposed in receiving proximity of the reflection of said radiated signal adjacent said source and said second photo cell being displaced outside the receiving proximity of the reflection of said radiated signal, whereby the sensed differential between said first and second photo cells is indicative of the presence of the selected components of said reflected signal.

6. Apparatus according to claim 5 wherein:

said first and second filters include polarized filters aligned in coherent relationship.

7. Apparatus according to claim 5 wherein:

said first and second filters include bandpass filters passing electromagnetic signals of mutually-exclusive frequency bands.

* * * * *